United States Patent
Clasquin et al.

(10) Patent No.: US 10,495,540 B2
(45) Date of Patent: Dec. 3, 2019

(54) APPARATUS AND METHOD FOR SEATING A TIRE BEAD ON A WHEEL RIM

(71) Applicant: Hunter Engineering Company, St. Louis, MO (US)

(72) Inventors: Joel A. Clasquin, Highland, IL (US); Michael Olsen, Lake St. Louis, MO (US); Charles Polster, Edwardsville, IL (US)

(73) Assignee: Hunter Engineering Company, St. Louis, MO (US)

( * ) Notice: Subject to any disclaimer, the term of this patent is extended or adjusted under 35 U.S.C. 154(b) by 223 days.

(21) Appl. No.: 15/793,821

(22) Filed: Oct. 25, 2017

(65) Prior Publication Data

US 2018/0120188 A1    May 3, 2018

Related U.S. Application Data

(60) Provisional application No. 62/414,472, filed on Oct. 28, 2016.

(51) Int. Cl.
   *G01M 1/22*   (2006.01)
   *G01M 17/02*  (2006.01)
   *G01M 1/04*   (2006.01)

(52) U.S. Cl.
   CPC ............ *G01M 1/225* (2013.01); *G01M 1/045* (2013.01); *G01M 17/022* (2013.01)

(58) Field of Classification Search
   None
   See application file for complete search history.

(56) References Cited

U.S. PATENT DOCUMENTS

| | | | | |
|---|---|---|---|---|
| 6,336,364 | B1* | 1/2002 | Parker | B65B 67/12 73/462 |
| 7,355,687 | B2* | 4/2008 | Voeller | B60C 11/24 356/139.09 |
| 7,404,427 | B2* | 7/2008 | Hillman | B60C 25/138 157/1 |
| 8,250,915 | B1* | 8/2012 | Voeller | G01M 17/021 73/460 |
| 8,613,303 | B1* | 12/2013 | Hanneken | B60C 25/056 157/1.17 |
| 8,985,178 | B1* | 3/2015 | Vaninger | B60C 25/13 157/1.1 |

(Continued)

*Primary Examiner* — Paul M. West
*Assistant Examiner* — Mark A Shabman
(74) *Attorney, Agent, or Firm* — Sandberg Phoenix & von Gontard PC (57) ABSTRACT

A wheel balancer incorporates tire bead manipulating tools under control of a processing system to apply a clamping pressure to tire sidewall surfaces of a wheel assembly secured to a spindle shaft, facilitating the proper seating of tire beads to the wheel rim. The spindle shaft is operatively coupled to a drive motor and transmission system under control of the processing system, capable of operating in both a high speed, low torque regime and a low speed, high torque regime to rotate the wheel assembly during either an imbalance measurement procedure or a tire bead adjustment procedure. A load roller assembly, under control of the processing system, is disposed to selectively apply a radial force at a tire circumferential tread surface as the wheel assembly is rotated about the spindle axis, further facilitating the proper seating of the tire beads.

9 Claims, 9 Drawing Sheets

(56) References Cited

U.S. PATENT DOCUMENTS

| | | | |
|---|---|---|---|
| 9,073,394 B1 * | 7/2015 | Clasquin | B60C 25/056 |
| 2006/0169414 A1 * | 8/2006 | Hillman | B60C 25/138 157/1 |
| 2011/0042875 A1 * | 2/2011 | Story | B60C 25/0545 269/57 |

* cited by examiner

APPARATUS AND METHOD FOR SEATING A TIRE BEAD ON A WHEEL RIM

CROSS-REFERENCE TO RELATED APPLICATIONS

The present application is related to, and claims priority from, U.S. Provisional Patent Application Ser. No. 62/414,472 filed on Oct. 28, 2016, which is herein incorporated by reference.

STATEMENT REGARDING FEDERALLY SPONSORED RESEARCH

Not Applicable.

BACKGROUND OF THE INVENTION

The field of the invention relates generally to wheel balancers and more specifically to wheel balancers configured to measure tire uniformity parameters and to alter tire uniformity parameters with tire bead seat massaging.

Much attention has been directed to problems associated with vibration issues in wheel assemblies consisting of a wheel rim and an associated tire mounted thereon. Techniques have been developed to detect wheel assembly combinations that are likely to cause such vibration issues, as well as to reduce or mitigate such vibration issues in a wheel assembly. Towards this end, wheel balancers are configured to reduce static and dynamic imbalances in a wheel assembly. Wheel balancer systems typically determine a measure of imbalance in a wheel assembly by an analysis of the mechanical vibrations resulting from rotation of the wheel assembly about an axis of a supporting spindle shaft. The mechanical vibrations are measured as motions, forces, or pressures by means of sensors such as transducers, which convert the mechanical vibrations into electrical signals. Wheel assembly imbalance may result from imbalance in the wheel rim, imbalance in the tire, or both. The wheel rims and tires may be rotated to relative positions with respect to one another to minimize vibrations, and correction weights may be applied to counteract unbalance forces in the wheel assembly to reduce measured vibrations to acceptable levels.

Even when properly balanced, non-uniformity in the construction of the tire or a runout in the wheel rim can cause significant vibration forces as the wheel assembly rolls across a road surface under vehicle load conditions. While most tire manufacturers inspect their tires on tire uniformity machines and grind surface material off the tires to remove non-uniformities in order to improve the rolling characteristics of the tires, the tires may still produce significant vibration forces that are unrelated to an imbalance of the wheel assembly as they roll on a smooth road. The reasons for this can be somewhat complex, and wheel balancer systems can, as a result, be quite sophisticated in addressing them.

A vehicle service provider that utilizes both a wheel balancer and a tire changer machine can effectively solve most vibration issues found in wheel assemblies. Following a tire changing procedure for the wheel assembly completed on a tire changer machine, the wheel assembly is analyzed with a wheel balancer to identify and correct imbalances. Finally, the wheel assembly is mounted to the vehicle for use. In some instances, the use of both a wheel balancer and a tire changer machine in such a manner results in an inefficient process for new tire installation. If a vibration issue is detected or predicted, but not solved, on the wheel balancer, the mounting arrangement of the wheel rim and tire must be altered by returning the wheel assembly to the tire changing machine. A more effective use of the two machines could be achieved if the wheel balancer provided an additional means for correcting detected vibration issues in the wheel assembly which are traditionally corrected only by re-mounting of the tire on the wheel rim using the tire changing machine.

Vibration issues in a wheel assembly with a newly mounted tire may arise from tire mounting issues that are no fault of the tire changing machine or a technician operating it. Specifically, in some instances, air can inadvertently become trapped between the tire bead and the wheel rim as a tire is mounted. Similarly, lubrication materials and the like can also inadvertently become trapped between the tire bead and the wheel rim. Either way, this can result in an uneven seating of the tire bead on the periphery of the wheel rim, resulting in vibrations of the wheel assembly that are is not easily amenable to correction other than by releasing the tire and remounting in an attempt to achieve an even or uniform seating of the tire bead to the wheel rim.

Because it is difficult to control conditions that may result in uneven seating of the tire bead on the wheel rim, and further because this occurrence is relatively unpredictable, trial and error is inevitable in attempting to correct a vibration issue attributable to this cause. A technician may attempt to correct the vibration issue on the wheel balancer by applying, removing, or altering imbalance correction weights, only to find the attempts unsuccessful. In this situation, the technician may believe that there is a problem with the wheel balancer or that a mistake was made. Because the uneven bead seating cannot be redressed by a conventional wheel balancer, however, such attempts will be unfruitful. The technician may at some point return to the tire changer to remount the replacement tire, or alternatively may abandon the replacement tire as defective, and install a second replacement tire on the wheel rim. Of course, this is frustrating to the technician, and to the vehicle owner, as the time needed to complete the tire installation becomes extended, sometimes greatly.

Accordingly, it would be beneficial to provide a wheel balancer with additional mechanisms for correcting vibration issues in a wheel assembly, and in particular, with mechanisms for correcting vibration issues caused by uneven bead seating and/or non-uniformity in a tire mounted to a wheel rim.

BRIEF SUMMARY OF THE INVENTION

The present disclosure is directed towards a vehicle wheel service system, such as a wheel balancer, which incorporates a pair of bead breaker tools under control of a processing system to selectively apply a clamping pressure to tire sidewall surfaces, facilitating the proper seating of the tire bead against the matching wheel rim bead seat surfaces. The wheel balancer includes a rotationally driven spindle for receiving a wheel assembly undergoing service. The spindle shaft is operatively coupled to a drive motor and transmission system under control of the processing system, capable of operating in both a high speed, low torque regime and a low speed, high torque regime to rotate the wheel assembly during either an imbalance measurement procedure or a tire bead adjustment procedure. A load roller assembly, under control of the processing system, is disposed to selectively apply a radial force at a tire circumferential tread surface as the wheel assembly is rotated about the spindle axis.

In a method of the present disclosure for improving the fitment of a tire to a wheel rim, a wheel assembly is secured to a spindle shaft of a wheel balancer. The wheel assembly is rotated about an axis of the spindle shaft while a radial load is applied to a circumferential tread surface. Simultaneously, a pair of bead breaker tools are engaged with the sidewall surfaces of the tire in proximity to the tire beads, applying axially inward forces to aid in fully seating the tire beads against the wheel rim bead set surfaces.

In a method of the present disclosure for reducing radial non-uniformity of a wheel assembly consisting of a tire mounted to a wheel rim, a wheel assembly is secured to a spindle shaft of a wheel balancer system. A load roller applies a generally radial load to a circumferential tread surface of the tire as the wheel assembly is rotated about an axis of the spindle. Radial force variations are measured and evaluated by a processing system of the wheel balancer, together with runout measurements associated with the wheel rim, to identify an angular remount position of the tire about the wheel assembly which will improve the radial uniformity of the wheel assembly. Using the identified angular remount position as guidance, a pair of bead breaker tools are engaged with the tire sidewall surfaces to unseat the bead of the tire with respect to the rim and secure the tire against rotation while the wheel rim is rotated about the spindle axis within the tire. When the tire and wheel rim are at the desired relative angular remount position, the beak breaker tools are withdrawn, and the tire reseated to the wheel rim bead seat surfaces.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. The drawings are for illustrating the concepts set forth in the present disclosure and are not to scale. Furthermore, The invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Exemplary embodiments of wheel balancers, wheel service systems, and wheel service methods are described below that overcome the difficulties and disadvantages explained above when servicing vehicle wheel assemblies consisting of a wheel rim and a tire mounted thereon. The wheel balancers, wheel service systems, and wheel service methods utilize load forces applied to wheel assemblies and associated force sensors in order to detect tire non-uniformity issues and to eliminate tire bead seating issues that may otherwise lead to vibration issues for wheel assemblies. Thus, vibration issues may be detected and/or addressed on a wheel balancer itself without necessarily requiring the use of a separate tire changer machine. Method aspects will be in part apparent and in part specifically discussed in the disclosure below.

FIGS. 1-6 illustrate an exemplary wheel balancer 100 including a frame or base 102 and a spindle assembly 104 attached to the base 102. The spindle assembly 104 is rotatable about an axis 112, and is adapted to axially receive and retain a wheel assembly 105 consisting of a rim 106 and a tire 108. The tire 108 includes a circumferential tread surface 108a, disposed between an inner sidewall 109a and an outer sidewall 109b, with each sidewall terminating at a radially inward circumferential edge defining a bead seat 150. The wheel rim 106 is secured to the spindle assembly 104 for rotation there with by any suitable clamping mechanism capable of engaging the spindle shaft. After the wheel rim 106 is clamped in position, a machine operator manipulates an input selector 110a, such as a touch-screen interface, trackball, or key, which directs a processor to engage a drive motor and transmission system coupled to the spindle assembly 104, rotating the wheel rim 106 and tire 108 about a spindle axis 112 in either a clockwise or counterclockwise direction as needed for the specific procedures to be carried out. Those of ordinary skill will recognize that these aforementioned features of a wheel balancer, and the methods of operation thereof, are well known in the industry, such as shown in U.S. Pat. No. 6,336,364 B1 to Parker et al. which is herein incorporated by reference.

The wheel balancer 100 is configured with a set of actuated bead breaker tools 116a, 116b provided on a movable carrier 117 to selectively engage a wheel assembly mounted to the spindle assembly 104 in order to exert pressure on the tire 108 to either manipulate or break the tire bead seal with the rim 106. The movable carrier 117 is configured to provide movement of the bead breaker tools 116a, 116b for two purposes, the first is to transfer the bead breaker tools 116a, 116b into and out of an operating position in which they are disposed adjacent the sidewall surfaces of a wheel assembly secured to the spindle shaft.

The second is to engage or disengage the bead breaker tools 116a, 116b with the sidewall surfaces.

The movable carrier 117 is configured to transfer the bead breaker tools 116a, 116b into and out of an operating position by linear movement along a first axis L1 which is perpendicular to the rotational axis 112 of the spindle shaft 104 (i.e., axis L1 is radial to the spindle shaft axis 112). Shifting the movable carrier 117 away from the spindle shaft axis 112 withdraws the bead breaker tools 116a, 116b from adjacent proximity to the tire sidewall surfaces, and permits the wheel assembly to be moved axially on and off of the spindle shaft 104 during loading and unloading operations. Conversely, shifting the movable carrier 117 towards the spindle shaft axis 112 disposes the bead breaker tools 116a, 116b adjacent to the tire sidewall surfaces, at which point, linear movement to engage or disengage the bead breaker tools with the wheel assembly can occur along a second axis L2 parallel to the spindle shaft axis 112. Shifting of the movable carrier 117 may be by any conventional mechanism, such as a combination of a hydraulic or pneumatic cylinder 117a and slide rails, or by a rack and pinion gear mechanism.

Alternatively, the movable carrier 117 may be configured to pivot about an axis (not shown), swinging the bead breaker tools 116a, 116b into and out of adjacent proximity to the tire sidewall surface. It will be recognized that while the movable carrier 117 is shifted or swung towards the spindle shaft axis 112, and the bead breaker tools 116a, 116b are disposed adjacent to the tire sidewall surfaces, the tire may not be easily dismounted from the spindle shaft 104, as axial movement of the wheel assembly is blocked by the bead breaker tools. As a further safety feature, the movable carrier 117 may be further shifted or swung towards the spindle shaft axis 112 to position the bead breaker tools 116a, 116b in adjacent proximity to the wheel rim, acting to prevent unintended separation of the wheel rim or tire from the spindle shaft 104 during rotational movement or tire inflation procedures.

Figure 1:
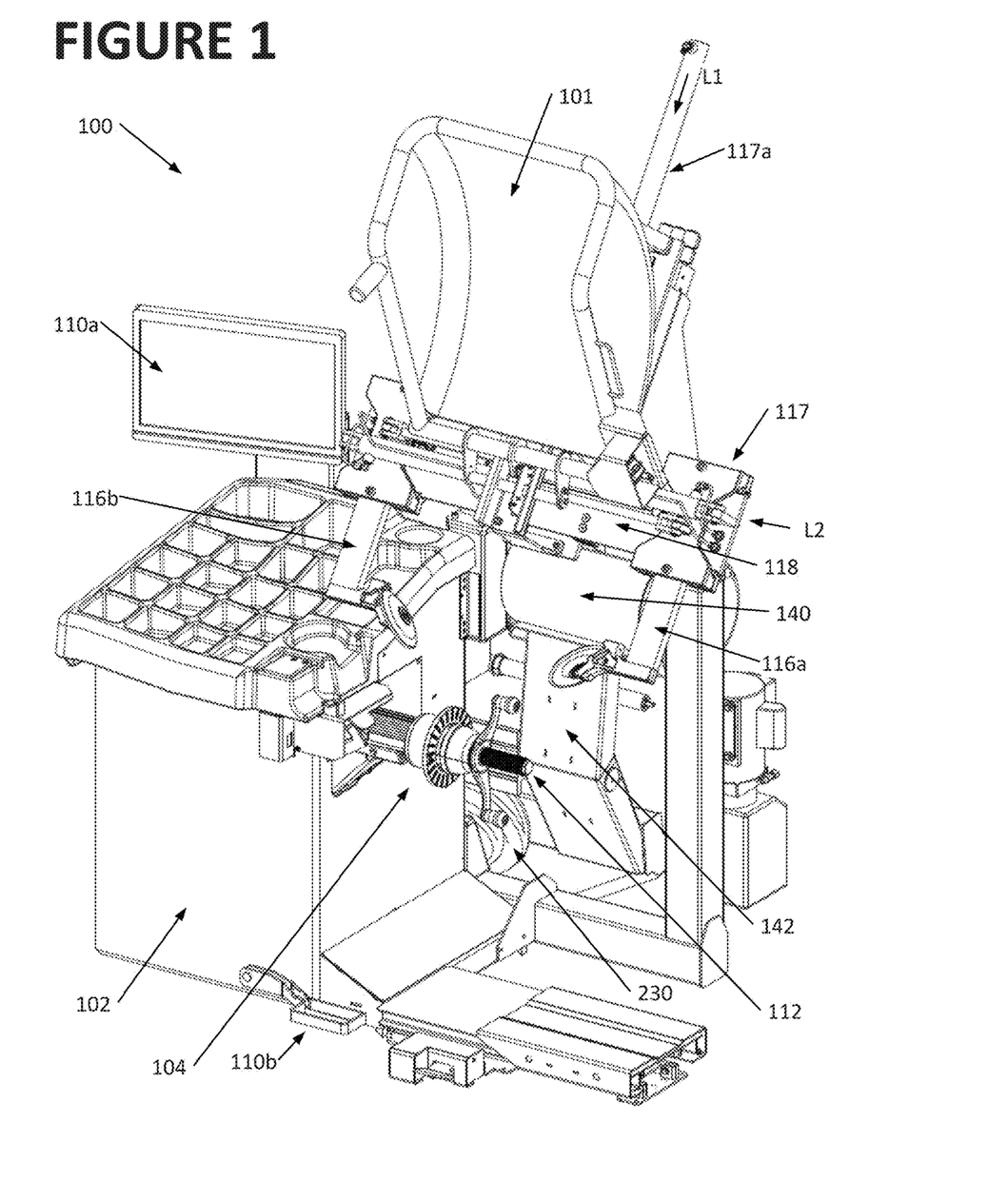
FIG. 1 is a front perspective view of a wheel balancer of the present disclosure, shown with the protective hood in an open position.
Figure 2:
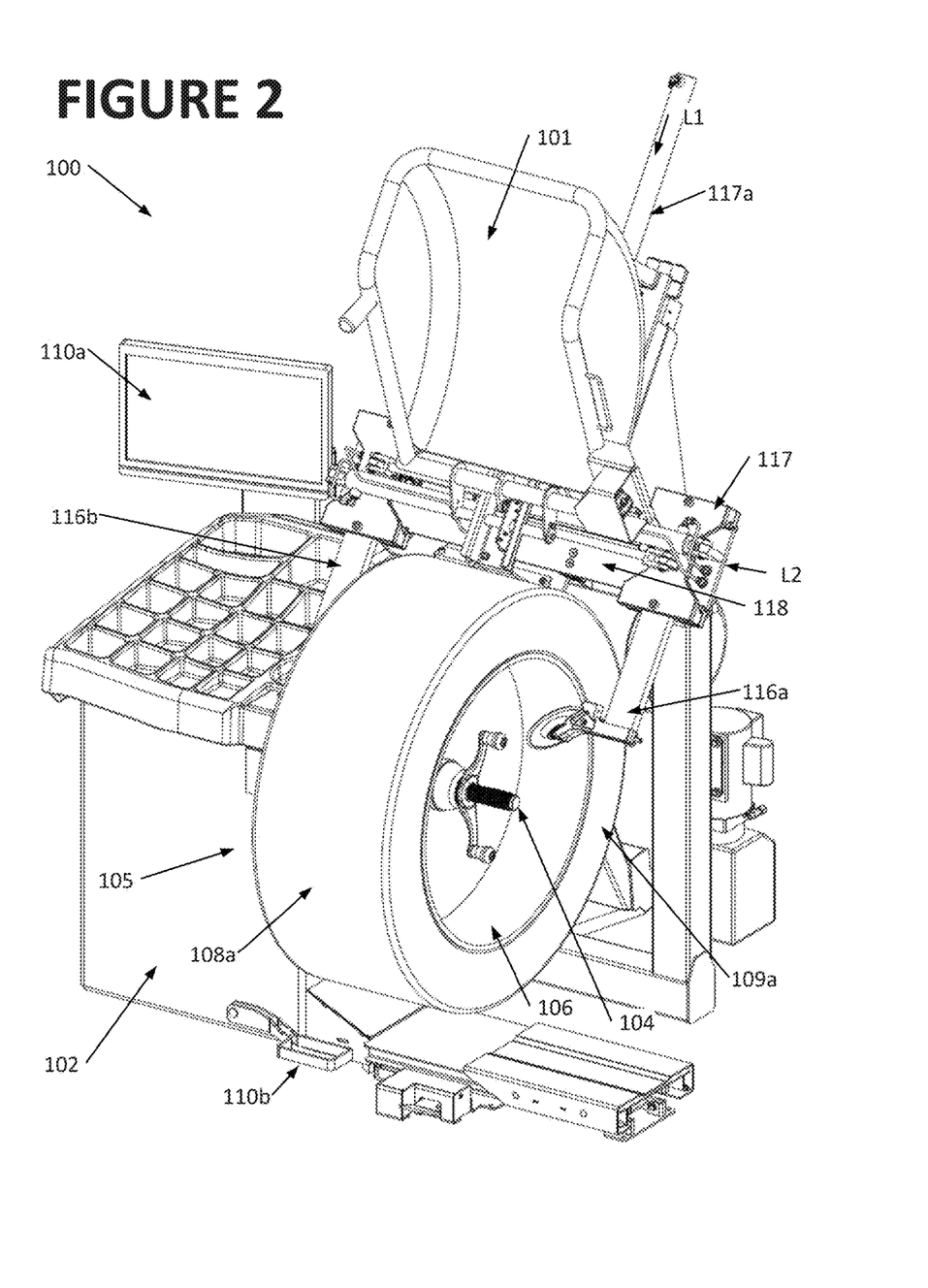
FIG. 2 is a view similar to FIG. 1, with a wheel assembly secured to the spindle shaft.
Figure 3:
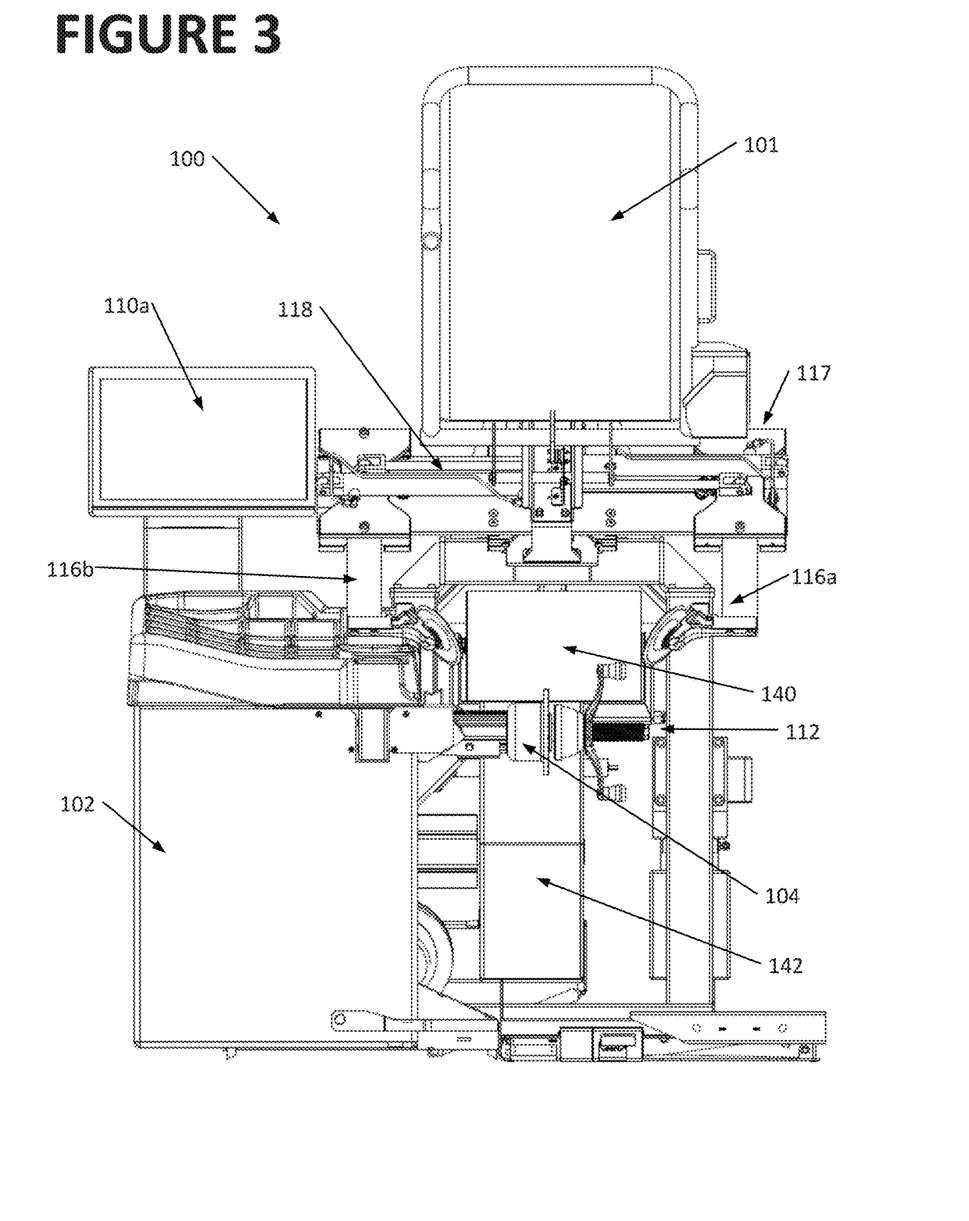
FIG. 3 is a front plan view of the wheel balancer of FIG. 1.
Figure 4:
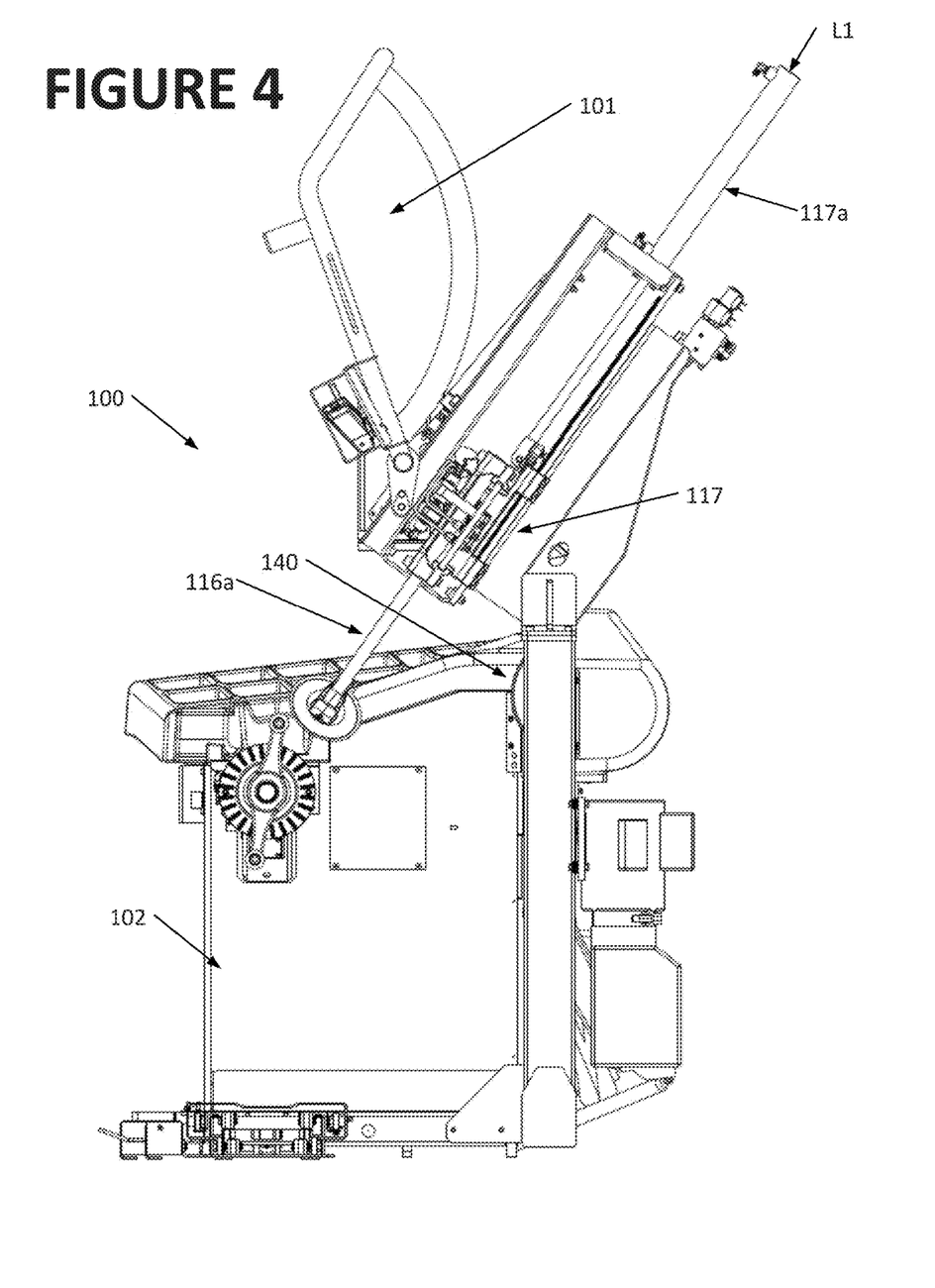
FIG. 4 is a side plan view of the wheel balancer of FIG. 1.
Figure 5:
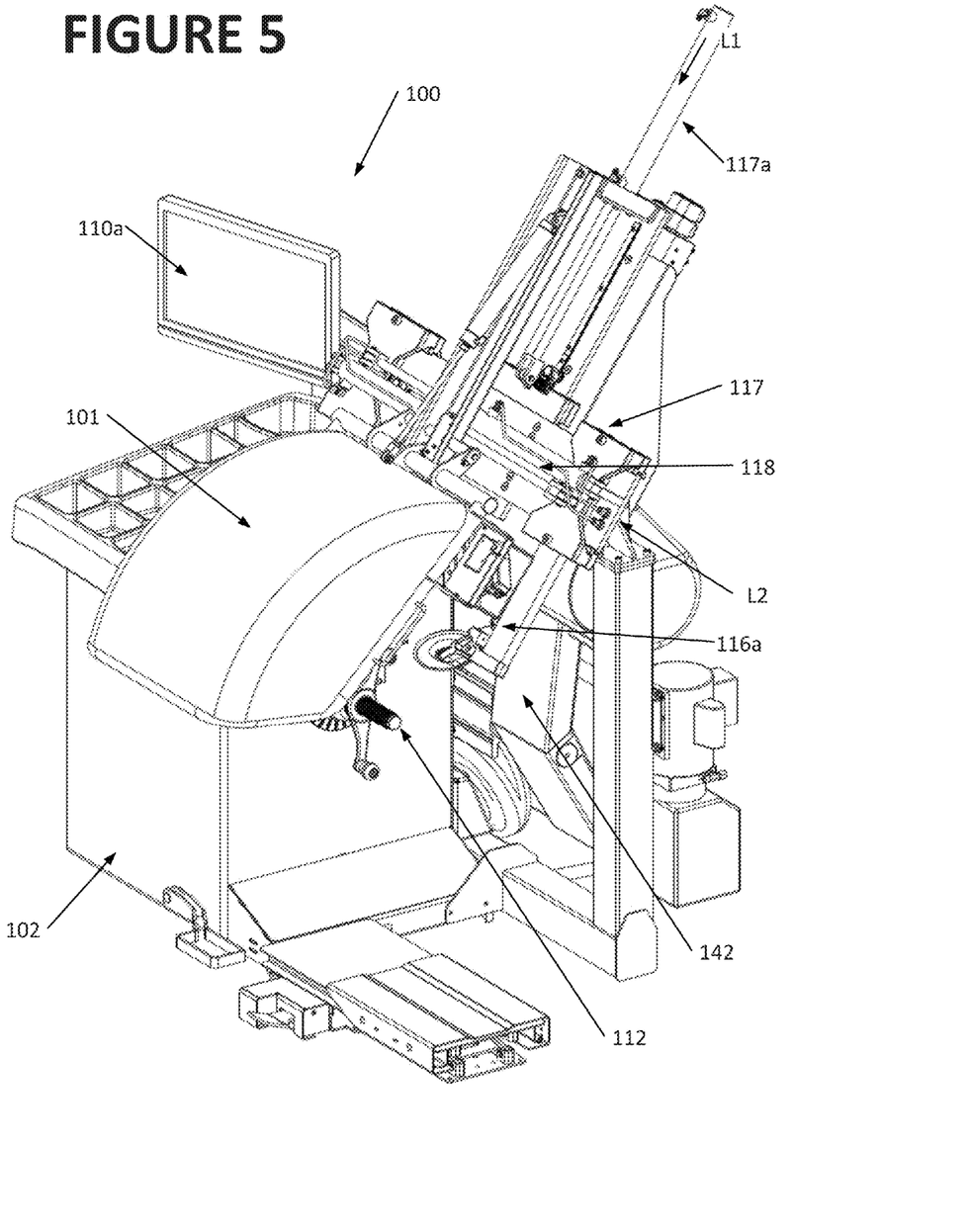
FIG. 5 is a front left perspective view of the wheel balancer of FIG. 1, with the protective hood in a closed position.
Figure 6:
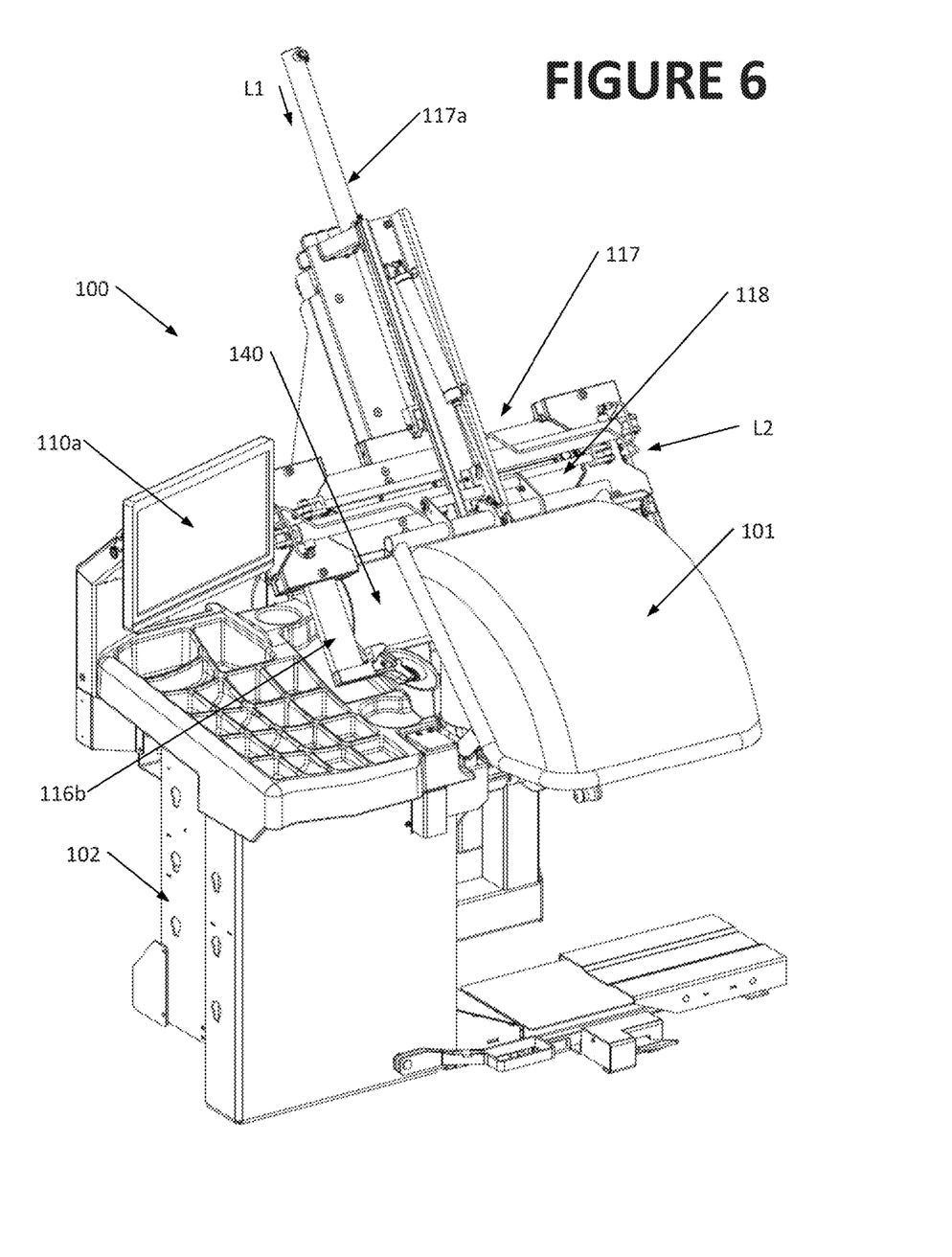
FIG. 6 is a front right perspective view of the wheel balancer of FIG. 1, with the protective hood in a closed position.

As seen in the exemplary figures, the bead breaker tools 116a, 116b consist of two laterally spaced tools 116a and 116b supported by the movable carrier 117, with tool 116b located axially inward of the tire 108 and tool 116a located axially outward of the tire 108 when the wheel assembly 105 is secured to the spindle assembly 104, as shown in FIG. 2. In another embodiment (not shown), a single bead breaker tool 116 is provided at either the inboard position, the outboard position, or is switchable between the inboard and outboard positions, operating to selectively apply forces to the corresponding tire sidewall surface. Each bead breaker tool 116a, 116b is operatively coupled to an associated actuation mechanism 118, such as a hydraulic or pneumatic cylinder and slide to facilitate controlled linear movement parallel to the axis of the spindle shaft. Exemplary operation of the bead breaker tools 116a, 116b, in the general context of a tire changer system, but using principles equally applicable to the wheel balancer 100 of the present application are described in U.S. Pat. No. 8,613,303 B1 to Hanneken et al. and the reader is referred thereto for further details.

The bead breaker tools 116a, 116b and associated actuation mechanisms 118 are configured to supply sufficient forces at the correct angles and locations with respect to the tire 108 mounted on a rim 106 supported on the spindle assembly 104, such that the beads 150 of the tire 108, defining the inner radial edge of each sidewall surface, may optionally be forced out of, or in to, corresponding bead seats 152 on the wheel rim 106 secured on the spindle shaft. To assist with locating and actuating the bead breaker tools 116a, 116b, sensory capability is provided in the wheel balancer 100 to monitor a position of the movable carrier 117 and each of the bead breaker tools 116a and 116b with respect to the spindle assembly 104, tire 108 and/or wheel rim 106. The sensory capability may consist of any type of sensor capable of providing position data required to monitor the bead breaker tools 116a and 116b, and may include linear transducers, potentiometers, displacement sensors, optical sensors, imaging sensors, and limit switches.

For example, a switch mechanism may be included that changes state when an edge 160 of a bead breaker tool 116a or 116b moves just beyond the outer rim edge 154 of a wheel rim 106, ensuring that the bead breaker 116a or 116b is positioned to engage a tire 108 at a predetermined location. Alternatively, machine vision systems can be utilized to provide data used to position the bead breaker tools 116a, 116b with respect to the wheel rim 106 at predetermined locations, or force feedback sensors may be integrated as monitoring and control features for the bead breaker tools 116a, 116b when in use. The positions of the bead breakers 116a, 116b, and operation of the spindle assembly 104 and other features of the wheel balancer 100 may be coordinated by a control unit 200 that may include a controller or processor 202, and actuator components 206 operatively connected to, and under control of, the controller or processor.

While sensory capabilities may be beneficial to the operation of the wheel balancer 100, in some embodiments they may be considered optional and accordingly not be utilized in favor of operator guided or manual positioning of the bead breaker tools 116a and 116b through the available inputs 110. For example, a wheel balancer operator may manipulate inputs 110, which communicates with the controller 202 to move the bead breakers 116a, 116b to desired positions, operate the spindle assembly 104, or activate other wheel balancer features. In illustrative embodiments, the inputs 110 may be a foot pedal 110b located near the bottom of the machine base 102 for convenient use by the operator. In further embodiments, other known inputs 110, including but not limited to levers, buttons, knobs, switches, joysticks, and touch sensitive screens 110a may be employed in various locations on or near the wheel balancer 100. An operator station including a display and an input device including a keyboard or other input selectors may be optionally provided for the benefit of the operator. Still other features of the wheel balancer 100 may be provided, such as tire inflation systems 144 and the like, familiar to those in the art.

Figure 9:
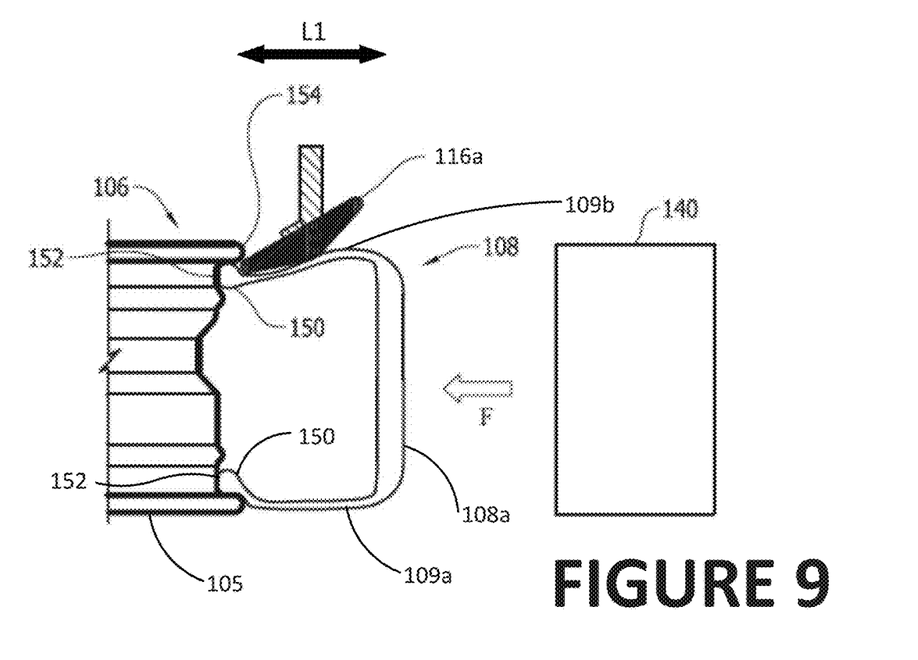
FIG. 9 is a sectional view similar to FIG. 8, including an application of force by the load roller.

The wheel balancer 100 preferably includes a load roller 140 mounted on linkage 142 and actuated by pneumatic or hydraulic actuator 230 to generate a radially directed force F on the circumferential tire tread, as best seen in FIG. 9. As explained below, the force F is established on the tire by the load roller 140 to enhance tire bead seating procedures, and also to facilitate detection of tire uniformity characteristics while the tire is being rotated on the machine 100, under loaded conditions.

Figure 7:
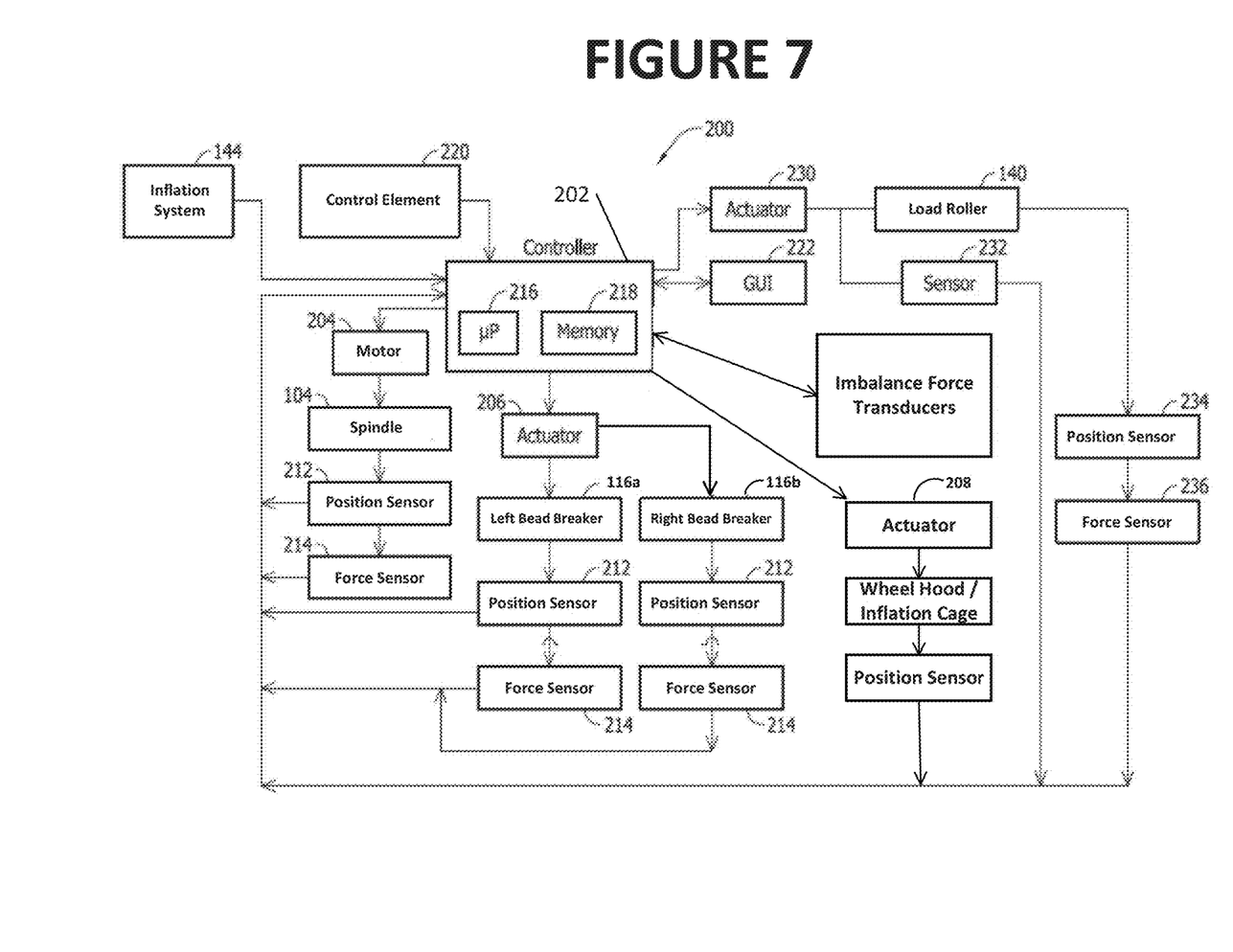
FIG. 7 is a block diagram representing the relationships between primary components of the wheel balancer of FIG. 1.

FIG. 7 schematically illustrates an exemplary control system 200 implemented in the wheel balancer 100. Using the control system 200, wheel balancing and bead seating procedures can be substantially automated such that little or no operator input is required, but nonetheless allowing operators an ability to control, oversee and adjust the wheel balancer operation if needed or as desired. The control system 200 can provide the benefits of full automation of certain aspects of wheel balancing and tire bead seating procedures while leaving other aspects in the discretion and manual control of the operator. As such, varying amounts of operator participation in wheel balancing and bead seating procedures can be provided.

The control system 200 includes a controller (or processor) 202 operatively coupled to various sensors and actuators directing the various components provided on the wheel balancer 100. More specifically, the controller 200 is operatively coupled to a motor and transmission 204 associated with the spindle assembly 104, the movable assembly and actuator systems 206 associated with the bead breakers 116a, 116b, and an actuator system 208 associated with a protective hood 101 or an inflation cage enclosure configured to at least partially surround or enclose a wheel assembly 105 mounted on the spindle assembly 104 during operation or tire inflation. Position sensors 212 and/or force sensors 214 may be provided to provide closed loop control feedback as shown, and to position the actuated components such as the bead breakers 116a, 116b in the appropriate locations for particular wheel balance, bead seat, or inflation procedures in an automated manner.

The motor/transmission system 204, and actuator systems 206, 208 and 230 may each consist of multiple components required to drive the associated systems and implement the required component movements in three dimensional space. Rotational movement at selected speeds and/or torque settings may be provided, for example, with the motor and transmission system 204 for the spindle assembly 104, contained within the tub or housing 102. Movement of the bead breakers 116a, 116b along two or more axes L1, L2 may be provided by different actuators as previously described. For example, using the respective actuators, a radial position of the bead breakers 116a, 116b measured along the first axis L1 perpendicular to the spindle axis 112 (FIG. 1) can be adjusted to meet varying diameters of wheel rims 106 and tires 108. Similarly, the axial positions of the bead breakers 116a, 116b can be adjusted synchronously or individually along the second axis L2 parallel to the spindle axis 112 to engage or disengage the tire 108. The bead breakers 116a, 116b may therefore apply directed pressure at the selected locations on the sidewall of a tire 108 for any wheel assembly 105 having dimensions within the available range of movement for the bead breakers 116a, 116b. Control of the actuators to position the bead breakers may be via operator input (i.e., manual control), may be via the controller 202 utilizing preset positions or wheel dimension, or in an additional embodiment, further feedback elements such as machine vision elements may be provided in the control system 200 to facilitate fully automated positioning of the bead breakers 116a, 116b without operator guidance or prior knowledge of the dimensions of the wheel assembly 105.

In various embodiments, the controller 202 may be, for example, a microcomputer, a programmable logic controller, or other processor-based device. Accordingly, the control system 200 may include a microprocessor 216 and a memory 218 for storing instructions, control algorithms and other information as required for the machine 100 to function in the manner described. The controller memory 218 may be, for example, a random access memory (RAM), or other forms of memory used in conjunction with RAM memory, including but not limited to flash memory (FLASH), programmable read only memory (PROM), and electronically erasable programmable read only memory (EEPROM). Alternatively, non-processor based electronics and circuitry may be provided in the controller 202 with equal effect to serve similar objectives. For example, a supercapacitor may be provided to give the controller time to store procedure sensitive data such as the current state in a software based state machine in the event of power loss. Other elements such as line filters and capacitors for filtering noisy power may be included. Data storage such as a USB memory stick, DVD, or hard disk may be provided for storage of various configurations or dimensions of wheel assemblies 105 that may be recalled to optimize tire seating or bead manipulation using the bead breakers 116a, 116b. The stored configurations may include detailed data regarding dimensional aspects of tires 108 and other information concerning the tires that may be useful and beneficial to the machine operator or the control system.

In various exemplary embodiments of the control system 200, the motor and transmission 204 and actuators 206, 208 and 230 may respectively be hydraulically, electrically, or pneumatically powered or actuated. Likewise, in various exemplary embodiments, the position sensors 212 utilized in the control system 200 may include positioning encoders, proximity switches, displacement sensors, or other switch devices, Hall Effect sensors, machine vision elements and other sensors and technologies known in the art. More than one type of positioning sensor or sensing technology may be utilized in numerous variations of machines with similar effects.

The control system 200 may also include a graphic user interface (GUI) 222 to allow for control of the automated functionality of the wheel balancer 100 as well as informative informational feedback for the operator via a display device such as the touch screen interface 110a, regarding execution of tire bead seat and remount procedures. The control system 200 may operate and implement the exemplary processes described below to facilitate the functionality described.

The control system 200 includes an actuator 230 associated with the load roller 140. One or more sensors 232, 234, 236 are also provided that sense operation of the load roller 140, rolling characteristics of the wheel, vibration, and other parameters of interest. The sensor 232 may include one or more of a force sensor, a position sensor, a pressure sensor, or other sensors familiar to those in the art. Detailed configuration and operation of the load roller 140 and associated mechanism can be found in U.S. Pat. No. 6,336,364 to Parker et al. which is herein incorporated by reference.

An inflation system 144 may optionally be provided to alter (by increasing or decreasing) the air pressure within a tire 108, to assess vibration issues of the assembly, uniformity parameters of the tire 108, and bead seating issues as discussed below. As the discussion below will make clear, however, the tire 108 need not necessarily be fully inflated in all contemplated embodiments, and in some instances at least some of the tire bead manipulation actions described below can be performed on an uninflated tire.

During operation, the load roller 140, selectively positioned via the actuator 230, engages the circumferential tire tread surface of the tire 108 on the wheel assembly 105 secured to the spindle 104, and applies a generally radial directed force F along an axis perpendicular to the drive axis 112. As the wheel assembly 105 is rotated by the spindle assembly 104, the sensors 232, 234 and/or 236 associated with the load roller 140 obtain a loaded measurement of the wheel assembly 105 with respect to the rotational axis 112. For example, the loaded measurements may correspond to displacement of the load roller 140 (as measured by the sensor 232 in one example) that is representative of a loaded radial runout of the wheel assembly 105, or the measurements may be obtained from a pressure sensor (as measured by the sensor 232 in another example) and associated variations in the radial force F, or may be related to a measure of the observed stiffness of the tire 108 (as measured by the sensor 232 in still another example). Alternatively, the loaded measurements acquired may be a measurement of a lateral force exerted by the wheel assembly 105 as it is rotated. In further and/or alternative embodiments, additional sensors may be associated with the load roller 140 to measure the same or different wheel assembly 105 measurement in various ways.

The actuator 230 for the load roller 140 is operable by the controller 202 to vary the force applied to the wheel assembly 105. In exemplary embodiments, the controller 200 may vary the force applied by the load roller 140 from one wheel assembly 105 to another, as a function of at least the diameter of the wheel assembly 105, a width of the tire 108, a diameter of the tire 108, and/or a diameter of the wheel rim 106. Alternatively, the controller 202 may also be responsive to an operator-selected tire parameter to adjust the force applied by load roller 140. Optionally, the graphical user interface 222 may be used to manually input to the control a desired force F to be applied by the load roller 200. The force applied by the load roller 140 may be applied during rotation of the wheel assembly 105 or during other testing of the wheel assembly 105 as desired.

In order to obtain measurements which are representative of loaded operating conditions for a wheel assembly 105, the load roller 140 applies a force F to the wheel assembly 105. The force, in various examples, may be greater than 150 pounds, 400 pounds, or even 900 pounds, although no particular amount of force is absolutely required. As one example, the controller 202 may signal the load roller actuator 230 to apply the desired force on the wheel assembly 105 with the load roller 140 during at least one complete revolution of the wheel assembly 105, after which the load roller 140 is disengaged from the wheel assembly 105. The loaded wheel assembly 105 measurements and measurements of the runout of the wheel rim 106 may be taken while the wheel assembly 105 is rotated at a relatively low speed, such as less than approximately 1.0-0.5 Hz.

Optionally, the sensor 232 may be disposed to measure runout at the bead seat 152 of the wheel rim 106, either mechanical or optical in different embodiments. The controller 202 is responsive to the measurement of the wheel rim 106 runout and to the loaded wheel assembly 105 force measurements received from the various sensors provided and, in response to the signals generated by the sensors, may determine an angular remount position of the tire 108 on the wheel rim 106 to minimize one or more predetermined uniformity parameters of the tire 108 or the wheel assembly 105.

The resulting determinations and/or measured values may be displayed to the machine operator on the graphical user interface 222. For example, the graphical user interface 222 may provide to the operator the angular remount position of the tire 108 with respect to the wheel rim 106 that would minimize the predetermined uniformity parameter for the wheel assembly 105. The controller 202 may be configured to determine and provide on the graphical user interface 222 a representation of a value of the uniformity parameter which would result were the tire 108 to be remounted to the indicated angular remount position on the wheel rim 106.

In one contemplated embodiment, the measurements acquired by the various sensors for determining runout of a wheel rim 106 are preferably acquired over at least two complete revolutions of the wheel assembly 105 about the spindle axis 112. Measurements from successive revolutions of the wheel rim 106 are preferably compared by the controller 202 to determine whether the measurements fall within a predetermined threshold of each other from one revolution to the next. The controller 202 may be responsive to observed differences in these measurements, exceeding a predetermined threshold, to acquire additional roundness measurements to identify and detect miss-alignment or miss-mounting of the wheel assembly 105 on the spindle assembly 104. Further details of the load roller application and sensor techniques to determine uniformity and runout parameters and the like are disclosed in the aforementioned U.S. Pat. No. 6,336,364 to Parker et al., to which the reader is referred for further details. Sensing of the various parameters discussed and corrective actions therefore are believed to be within the purview of those in the art and no further explanation is believed to be necessary.

In one embodiment of the present disclosure, the load roller 140 is utilized in combination with the bead breakers 116a, 116b to facilitate proper seating of each tire bead 150 onto an associated bead seat 152 of the wheel rim 105. While the load roller 140 is engaged with the tire circumferential surface to generate an applied force, the controller 202 actuated the motor and transmission system 204 in a low speed/high torque regime to rotate the wheel assembly 105 about the spindle axis 112, and drives the actuators 206 to move the bead breakers 116a, 116b into engagement with the tire sidewall surfaces as described below. The movement of the bead breakers 116a, 116b may be manually directed by a machine operator into a desired position, or automatically directed by the controller 202 using the position sensors 212 and a reference input or otherwise determined by the controller 202, such as by utilizing recalled tire diameter dimensions. The bead breakers 116a, 116b are controlled to apply a sufficient force, which may be monitored by the controller 202 using the force sensor 214 associated with the bead breakers 116a, 116b, to deflect the tire sidewall and/or the tire bead 150 but not to break the tire bead seal. By engaging the tire sidewall with such force while the load roller 140 is applied, and while the wheel assembly 105 is rotationally driven around the spindle axis, the fitting of the tire bead 150 into the bead seat 152 is effectively massaged to eliminate any trapped air or lubricants and the like. By doing so, any likelihood of uneven seating of the tire bead 150 is practically eliminated, and so is problematic trial and error to address any related vibration of the wheel assembly 105.

In another embodiment, the controller 202 may engage the actuators 206 to move the bead breakers 116a, 116b into engagement with the tire sidewall without applying the load roller 140. That is, sufficient pressure may be applied to the tire sidewall to deflect the tire sidewall and/or the tire bead 150, without breaking the tire bead seal as described above. As before, the seating of the tire bead 150 in the bead seat 152 may be massaged for several revolutions of the wheel assembly 105 about the spindle axis 112 to eliminate trapped air, lubricants and the like but without applying the load force of the roller 140. As such, problematic trial and error to correct vibration issues attributed to uneven seating of the tire bead 150 can still be avoided in a balancer machine that does not include a load roller 140. Therefore, in some embodiments, the load roller 140 may be considered an optional feature and may be omitted.

With certain types of tires 108, the tire bead seal may be sufficiently established when the tire 108 is mounted to the wheel rim 106 to facilitate the tire bead massage without having to adjust the tire air pressure to a predetermined level to fully complete the seal. Especially for stiff-walled tires that provide a good deal of contact force in the vicinity of the tire bead 150 when mounted to the tire bead seat 152 of a wheel rim 106, by massaging the tire bead seal with the bead breakers 116*a*, 116*b*, uniform tire bead seating may be accomplished prior to fully inflating the tire 108. As such, in still another embodiment, the controller 202 may engage the actuators 206 to move the bead breakers 116*a*, 116*b* into engagement with the tire sidewall without inflating the tire 108 to a predetermined pressure first.

For example, the bead breakers 116*a*, 116*b* may apply force to the sidewall of an uninflated or deflated tire 108 to deflect the tire sidewall and/or the tire bead 150, without breaking the tire bead seal, and still effectively massage the seating of the tire bead 150 within the bead seat 152 while the wheel assembly 105 is rotated about the spindle axis to eliminate any trapped air or lubricants and the like that may otherwise cause non-uniform sealing of the tire bead 150. As used herein, an "uninflated" tire shall refer to a tire 108 that has not previously been inflated to a predetermined pressure, while a "deflated" tire shall refer to a tire 108 that has at least once been inflated to a predetermined inflation pressure, and then deflated to a lower pressure, including but not necessarily limited to zero pressure. Of course, in some embodiments it may be desirable to massage the seating of the tire bead 150 a first time while the tire 108 is uninflated (or deflated) and at a second subsequent time while the tire 108 is inflated. In other embodiments, the tire bead may be messaged once with the tire 108 inflated and again with the tire 108 deflated (or vice versa).

Figure 8:
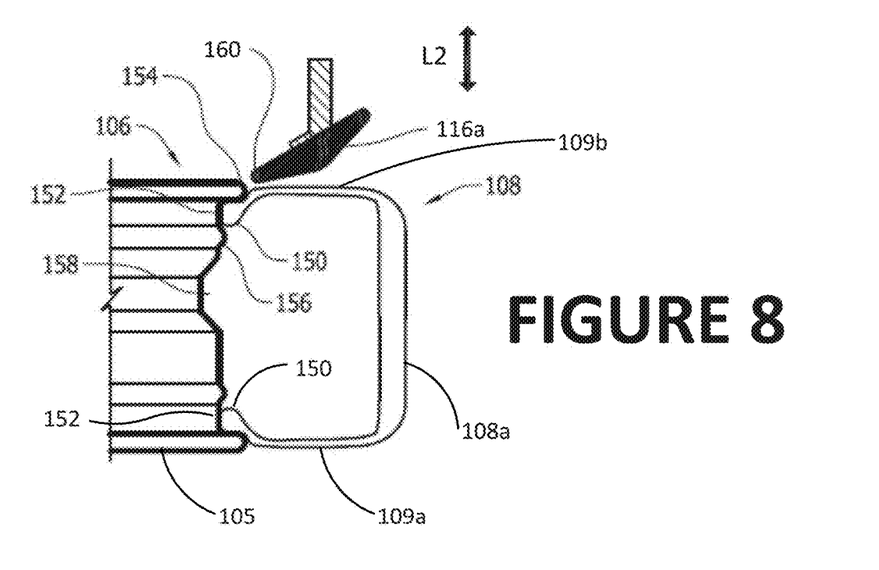
FIG. 8 is a sectional view of a wheel assembly illustrating a bead massage operation by a bead breaker tool on the wheel balancer of FIG. 1.

In further contemplated embodiments, the load roller 140 could likewise be utilized on an uninflated or deflated tire 108 to achieve at least some of the benefits described herein, whether in combination with or separate from the bead breaker tools 116*a*, 116*b* providing the tire bead massage features as described. FIG. 8 is a partial cross sectional view of the wheel assembly 105 mounted to the wheel balancer 100 with one of the bead breaker tools 116*a* in a first operating position. The tire 108 is shown mounted to the wheel rim 105 with the tire bead 150 seated in the bead seat 152 of the wheel rim. As illustrated, the bead seat 152 is located beneath an outer rim or lip 154 extending on the periphery of the wheel rim 106. FIG. 8 illustrates the bead breaker tool 116 located adjacent the lip 152 of the wheel rim.

FIG. 9 is a second partial cross sectional view of the wheel assembly 105 mounted to the wheel balancer 100 with the bead breaker tool 116*a* in a second operating position. The tire 108 is now deflecting under the force of the bead breaker tool 116*a*, but the tire bead 150 has not broken from the bead seat 152.

The uniform tire bead seal in a mounting procedure is further enhanced when, as shown in FIG. 9, the load roller 140 simultaneously applies the radial force F to the tire tread surface. The combination of tire deflection and radial force promotes a uniform tire bead seal to a level that neither on their own provides, and reduces the possibility of a non-uniform tire bead seal even further. As noted above, however, the load roller 140 may be considered optional in some embodiments and need not be provided.

When implemented, the simultaneous action of the bead breakers 116*a*, 116*b* to engage the tire sidewall with force and the action of the load roller 140 to apply the radial force beneficially facilitates a time saving, single step operation of the wheel balancer 100. As such, the wheel balancer 100 simultaneously reduces potential vibration issues associated with non-uniform seating of the tire beads 150 while detecting and correcting other conditions (such as imbalance) that may also cause vibration. By monitoring the rate of change of monitored signals from the sensors described above, the wheel balancer can appropriately address different sources of wheel assembly 105 vibrations using a minimal amount of time. For example, by monitoring the rate of change of radial force variation as the wheel assembly 105 is rotated about the spindle axis 112, the wheel balancer 100 can effectively isolate vibration attributable to uneven tire bead seating from other types of vibration. That is, when a detected radial force variation is found to exist but is improving over time during the bead massage procedure, it can be inferred that the tire bead massage is beneficial to provide more uniform tire bead seating and may continue. When the detected radial force variation ceases to improve and reaches a steady state, then it can be inferred that whatever vibration remains is not caused by uneven tire bead seating, and other corrective action, such as the installation of imbalance correction weights, can be taken.

Uniform tire bead seating can also be enhanced by inflating the tire 108 to its maximum allowable inflation pressure, as determined by the tire manufacturer, and then utilizing the inflation system 144 to deflate the tire in a controlled manner, such as by utilizing the deflation feature of the inflation system, to its normal or desired operating pressure for use (typically the recommended tire pressure of the tire manufacturer). Inflating the tire 108 to its maximum pressure provides further force effect to remove gaps in the tire bead seating and/or to detect force variation and other parameters as discussed above via operation of the load roller 140. The load roller 140 applying the load force may also reduce or eliminate non-uniformities that may exist in the replacement tire 108.

Figure 10:
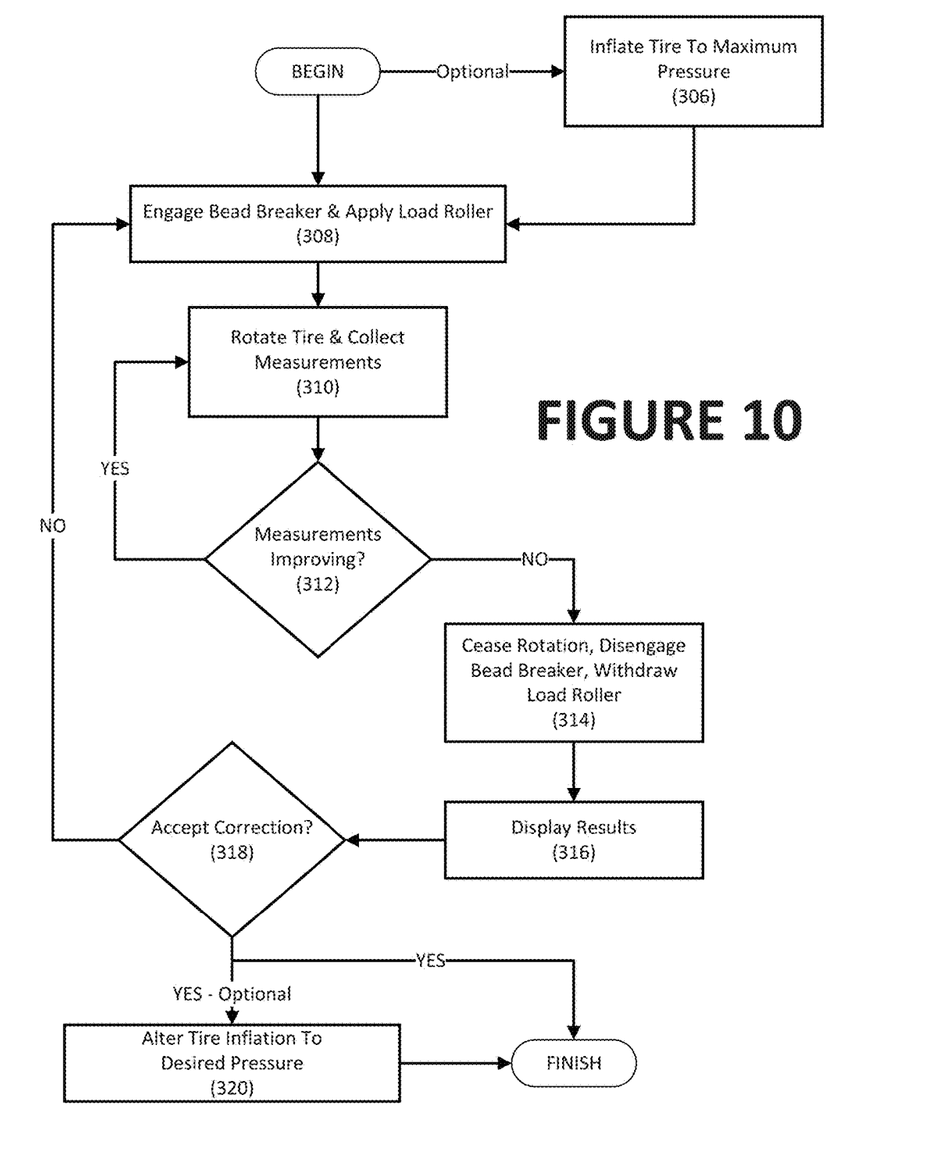
FIG. 10 is a flow chart illustrating a procedure of the present disclosure for correcting a wheel assembly vibration through bead massaging.

As shown in FIG. 10, a procedure for monitoring and correcting radial force variations in a wheel assembly 105 due to incomplete bead seating of the tire 108, as generally described above, is illustrated. Initially, the tire 108 is inflated to its maximum allowable pressure as shown at step 306. At step 308, the bead breakers 116*a*, 116*b* are engaged, the load roller 140 is applied, while the wheel assembly 105 is rotated on the spindle assembly 104. As discussed above, in one contemplated embodiment the engagement of the bead breakers 116*a*, 116*b* and the application of the load roller 140 occurs simultaneously.

When step 308 commences, the wheel assembly 105 measurements are collected at step 310. Thus, for example, radial force variation measurements may be collected, radial runout measurements may be collected, lateral force measurements may be collected, and lateral runout measurements may be collected. Other uniformity parameters may be assessed by the control system 200 as desired with similar effects. One measurement may be collected, or multiple measurements may be collected, in various embodiments.

At step 312, the collected measurement(s) is/are monitored by the controller 202 to see if they are improving. Thus, in the case of radial force variation being measured and monitored, the radial force variation would be considered to be improving when it is decreasing over time. By contrast, if the force variation is constant it would not be improving, nor would it be improving if the monitored force variation was increasing over time (a likely indication of an error condition that the controller 202 could interrupt). Other parameters besides radial force variation could likewise be monitored if desired. In any event, if the monitored measurement is showing improvement over time, the measurements are continued to be collected at step 310. This may result in the wheel assembly 105 being rotated for an indefinite period of time or an indefinite number of revolutions that exceed the time or number of revolutions ordinarily required to measure runout values or other parameters.

If the monitored measurement(s) are found to not be improving at step 312, rotation of the wheel assembly 105 about the spindle axis 112 ceases at step 314, and the results are displayed on the graphical user interface at step 316. Thus, radial force variation values, radial runout measurements, lateral force measurements, and lateral runout measurements may be displayed, as well as other desired parameters. Once the results are displayed for the machine operator's inspection, corrective action may be taken by the operator (or perhaps even automatically by the control system 200 described above) to minimize vibration issues or to bring them to acceptable levels, including but not necessarily the use of correction weights to mitigate static or dynamic imbalance issues. At step 318, the corrections may be accepted, and the control system 200 may revert to step 308 to engage the bead breaker tools 116a, 116b and the load application roller 140 to repeat steps 310 to 318.

When the results are acceptable and no further corrections are needed, the tire 108 may be deflated, such as through controlled air pressure release through the inflation system 144, from its maximum allowable pressure to its normal or desired operating pressure at step 320. At this point, the wheel assembly 105 may be removed from the wheel balancer spindle shaft 104 and mounted to a vehicle if vibration issues no longer exist.

In various embodiments and examples, the steps disclosed may be partly executed by the controller 202 and partly executed by the machine operator or may be wholly executed by the controller 202 with no involvement by a machine operator to either initiate the process or its steps, or to interrupt the process and its steps by failing to operate the dead man control element 220. Thus, various combinations of manual and automatic operation of the wheel balancer 100 are possible. For example, the tire inflation at step 306, and/or deflation at step 320 may be performed automatically by the machine using an integrated tire inflation system, or may be manually performed by a machine operator using an inflation system (either integrated into the machine or separately supplied).

It is further contemplated that in certain embodiments some of the steps shown in the algorithm 300 may be considered optional, and also that the steps need not necessarily be shown in the order performed. As one example, the tire 108 need not be inflated to its maximum inflation pressure 306, and in some embodiments need not be inflated at all, in order to successfully obtain at least some of the benefits described, and therefore steps 306 and/or 320 may not need to be performed in all cases. As another variation, the tire 108 may be inflated to its maximum pressure and lowered to another normal pressure as described, but the tire 108 need not be inflated prior to engaging the bead breakers 116a, 116b and applying the load roller 140 as shown at step 308, nor does the tire 108 necessarily need to be deflated after corrections are accepted at step 318. Rather, the tire 108 could both be inflated and deflated prior to step 308 or alternatively the tire 108 could both be inflated and deflated after step 308. As yet another variation, the load roller 140 need not be applied in step 308 in all embodiments, and the measurements of step 310 can be considered optional.

Moreover, the actions shown at step 308, for example, may encompass a series of steps. For example, the rotation of the wheel assembly 105 need not be at the same time as the application of the load roller 140 or the engagement of the bead breakers 116a, 116b. The application of the load roller 140 and/or the engagement of the bead breaker tools 116a, 116b may occur before the rotation starts, as the rotation begins, or after the rotation has started in various embodiments. Numerous other variations are believed to be possible and would be apparent to those in the art.

Having described the algorithm 300, it is believed that those in the art may program the controller 202 or otherwise configure it to implement the user interfaces and processes reflected in FIG. 10. It is again recognized that not all of the process steps as shown and described in FIG. 10 are necessary to accomplish at least some of the benefits described. It is further recognized that the sequence of the steps as described are not necessarily limited to the particular order set forth, and that some of the functionality described can be achieved with other sequences of steps. Additional steps beyond those specifically described may be implemented in combination with the steps described.

An exemplary embodiment of a wheel balancer 100 for servicing a tire 108 mounted on a wheel rim 106 has been disclosed. The tire 108 has a sidewall, and the wheel balancer 100 includes a spindle assembly 104 configured to receive the wheel rim 106, a drive assembly configured to rotate the wheel rim about an axis 112 of the spindle, bead breaker tools 116a, 116b configured to engage the sidewall of the tire 108 mounted to the wheel rim 106, and a controller 200 operatively coupled to control the bead breakers and the drive assembly. The controller 200 is configured to: engage the drive assembly to rotate the spindle assembly 104; and operate the bead breaker tools 116a, 116b, while the spindle assembly is being rotated, to engage the sidewall and deflect a portion of the tire 108 without unseating the tire bead 150 from the bead seat 152, thereby improving a uniformity of a tire bead seal with the wheel rim 106.

Optionally, the wheel balancer 100 also includes a load roller 140 configured to apply a radial force to the circumferential tread of the tire 108 when the wheel assembly 105 is secured to the spindle drive assembly 104, and the controller 200 is further configured to operate the load roller 140 to apply the radial force to the tire sidewall while the spindle drive assembly 104 is being rotated and while the bead breakers 116a, 116b are engaged. The controller 200 is further configured to monitor signals from various sensors while the load roller 140 is in contact with the tire 108 and determine whether or not a tire uniformity parameter is changing. The tire uniformity parameter may be one of a radial force parameter, a radial runout parameter, a lateral force parameter, or a lateral runout parameter.

The present disclosure can be embodied, in-part in the form of computer-implemented processes and apparatuses for practicing those processes. The present disclosure can also be embodied, in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied, in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method to reduce force variation in a wheel assembly consisting of a rim and a tire mounted thereon, the tire including a circumferential tread surface disposed between inner and outer sidewalls, each sidewall supporting a tire bead radially inward from said tread surface for establishing seals with corresponding bead seat surfaces of the wheel rim, and the wheel rim mounted for rotation about a spindle axis on a wheel balancer having bead breaker tools disposed on a movable assembly and a controller, the method comprising:

operating the movable assembly to position the bead breaker tools on opposite axial sides of the wheel assembly;

operating each bead breaker tool while the wheel assembly is rotating about said spindle axis to engage and apply controlled compression forces to the rotating sidewalls of the tire; and regulating, with said controller, said engagement between said bead breaker tools and said sidewalls of the tire to maintain said applied compression forces below a level of force required to break said tire bead free from said bead seat surface of the wheel rim during said rotation.

2. The method of claim 1, the wheel balancer also having a load roller assembly, the method further comprising:

engaging the load roller with the circumferential tread surface of the tire, to apply a generally radial force to said tread surface perpendicular to said spindle axis of rotation while the tire is rotating and while the bead breaker tools are in engagement with, and applying said compression forces to, the sidewalls of the tire;

monitoring, with said controller, a signal indicative of one of a uniformity parameter of the tire while the bead breaker tools are engaged with the tire sidewalls and the load roller is engaged with the circumferential tread surface of the tire; and responsive to said monitoring of said signal indicating a change in said uniformity parameter, sustaining engagement between the tire surfaces and each of the bead breaker tools and the load roller for at least one additional rotation of the wheel assembly about said spindle axis.

3. The method of claim 2, wherein said uniformity parameter is either a tire radial force or a radial runout of the tire; and wherein engagement of the bead breaker tools and the load roller is sustained while said monitoring of said signal indicates said uniformity parameter is decreasing.

4. The method of claim 2, further comprising the step of inflating the tire prior to engaging the load roller.

5. The method of claim 2, wherein said uniformity parameter of the tire is at least one of a radial force parameter, a radial runout parameter, a lateral force parameter, and a lateral runout value for the tire.

6. The method of claim 2 wherein in response to said monitoring indicating a magnitude of the measured uniformity parameter is decreasing, maintaining application of said compressive force to said tire sidewall surfaces and said radial force to said tire tread surface together with said driven rotation.

7. The method of claim 1, further comprising altering an inflation pressure of the tire.

8. The method of claim 7, further comprising inflating the tire to a maximum allowable inflation pressure therefor, and thereafter lowering the inflation pressure from the maximum allowable inflation pressure to a lower desired inflation pressure.

9. The method of claim 1, wherein movement of the bead breaker tools is regulated to automatically apply said compression forces to the inner and outer sidewalls of the tire.

* * * * *